United States Patent
Wen et al.

(10) Patent No.: US 7,176,457 B2
(45) Date of Patent: Feb. 13, 2007

(54) MEMS DIFFERENTIAL ACTUATED NANO PROBE AND METHOD FOR FABRICATION

(75) Inventors: Shih-Yi Wen, Hsinchu (TW);
Hsiao-Wen Lee, Hsinchu (TW);
Jui-Ping Weng, Hsinchu (TW);
Ming-Hung Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/218,425

(22) Filed: Sep. 6, 2005

(65) Prior Publication Data

US 2006/0016986 A1    Jan. 26, 2006

Related U.S. Application Data

(62) Division of application No. 10/795,407, filed on Mar. 9, 2004, now Pat. No. 6,995,368.

(30) Foreign Application Priority Data

Oct. 17, 2003    (TW) .............................. 92128875 A

(51) Int. Cl.
*G21K 7/00* (2006.01)
(52) U.S. Cl. ..................................... 250/306
(58) Field of Classification Search ............... 250/306, 250/307; 73/105
See application file for complete search history.

(56) References Cited

U.S. PATENT DOCUMENTS

| 6,995,368 | B2 * | 2/2006 | Wen et al. .................. 250/306 |
| 2002/0061662 | A1 * | 5/2002 | Boggild ...................... 438/800 |
| 2003/0182993 | A1 | 10/2003 | Hantschel et al. |
| 2004/0118192 | A1 | 6/2004 | Kley |

OTHER PUBLICATIONS

Vettiger et al., IBM J. Res. Develop., vol. 44, No. 3, May 2000, pp. 323-340.
Bullen et al., "Micromachined Arrayed Dip Pen Nanolithography Probes for Sub-100nm Direct Chemistry Patterning," I.E.E.E. 2003.

* cited by examiner

*Primary Examiner*—Kiet T. Nguyen
(74) *Attorney, Agent, or Firm*—Birch, Stewart, Kolasch & Birch, LLP

(57) ABSTRACT

A MEMS differential actuated nano probe includes four suspension beams arranged in parallel, a connecting base connecting to the suspension beams, a nano probe. Two of the suspension beams elongate due to thermal expansion to allow the deflection of the probe. By heating the suspension beams at different positions, the MEMS differential actuated nano probe can move in two directions with two degrees of freedom. The deflection of the MEMS differential actuated nano probe can be also achieved in piezoelectric or electrostatic way.

3 Claims, 6 Drawing Sheets

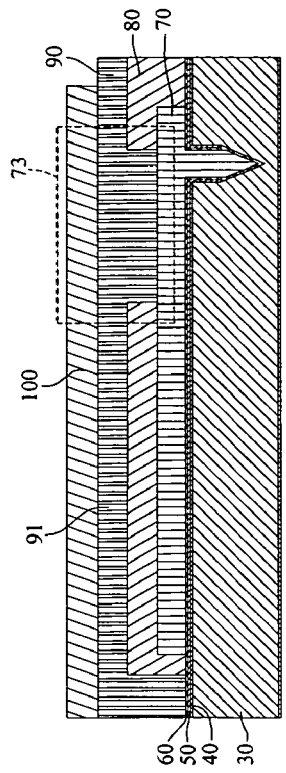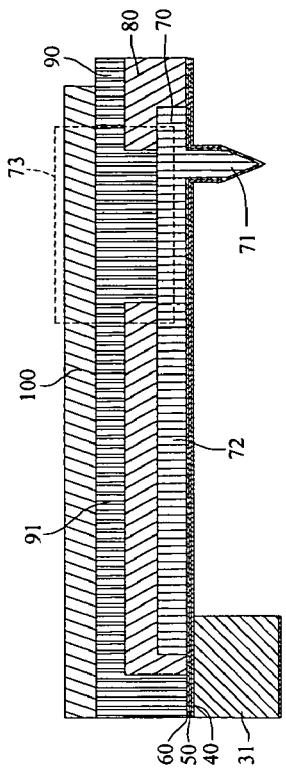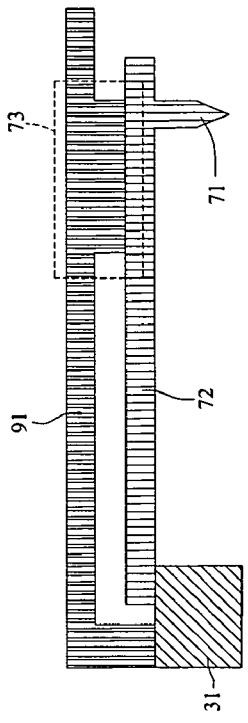
FIG.4I
FIG.4J
FIG.4K
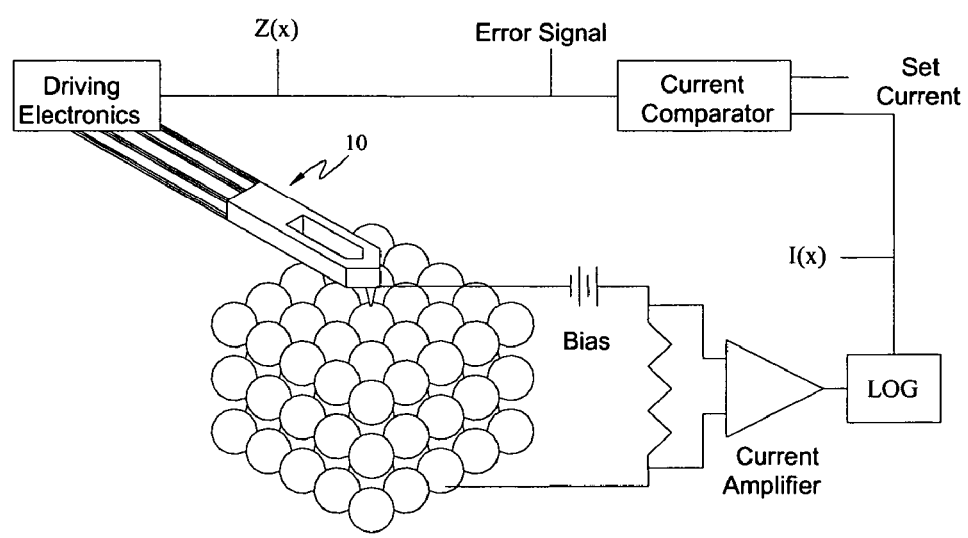
FIG.5

MEMS DIFFERENTIAL ACTUATED NANO PROBE AND METHOD FOR FABRICATION

This application is a Divisional of application Ser. No. 10/795,407, filed on Mar. 9, 2004, now U.S. Pat. No. 6,995,368 and for which priority is claimed under 35 U.S.C. § 120; the entire contents of which are hereby incorporated by reference.

BACKGROUND OF THE INVENTION

1. Field of Invention

The present invention relates to a MEMS differential actuated nano probe applicable in data storage, nanolithography and scanning probe microscope such as a scanning tunneling microscope (STM), atomic force microscope (AFM), electric force microscope (EFM), Kelvin force microscope (KFM), scanning Maxwell force microscope (SMM), frictional force microscope (FFM), lateral force microscope (LFM), magnetic force microscope (MFM), magnetic resonance force microscope (MRFM), scanning capacitance microscope (SCM), scanning thermal microscope (SThM) and scanning near-field optical microscope (SNOM), and more particularly to a MEMS (Micro Electrical Mechanical System) differential actuated nano probe.

2. Related Art

The currently available nano probe technology is based on a work platform of an atomic force microscope (AFM). The principle of the AFM uses the force lower than 1 nano Newton (about $10 \times^{-7}$ g) to finely sketch a structure of a sample to be tested with horizontal resolution below 10 nanometers and vertical resolution below 1 nanometer. The nano probe has cured the disadvantages regarding to diffraction limitation encountered in the conventional optical microscope, and has great contribution in micrometer and nanometer scale technology. However, most of the currently available nano probes are of passive types using an additional high-precision positioning platform to achieve topography scanning in a nanometer scale.

In an IBM journal "Journal of Research and Development", Vol. 44, No. 3, 2000, titled "The Millipede-more than one thousand tips for future AFM data storage", probes are driven in a thermo-mechanical way to perform reading and writing on a polymer film.

The positioning of the probes is operated via a driver that is controlled piezoelectrically or electromagnetically. The probes server to heat at fixed position. The driver drives the probes to move so as to write data on a polymer data storage medium.

In a paper published in MEMS Conference in January, 2003, titled "Micromachined arrayed DIP PEN nanolithography probes for sub-100 nm direct chemistry patterning", disclosed an active nano probe made of $Si_3N_4$ and Au respectively having different thermal expansion coefficients. When the nano probe is heated, the nano probe deflects toward the material having a smaller thermal expansion coefficient. Furthermore, the nano probe has characteristics of moving in single direction with one degree of freedom.

In the above or other current disclosures, passive nano probes only serve to heat, without movement. Therefore, an additional actuator is needed to drive the probe to move for scanning. The active nano probes only have single direction with one degree of freedom. Both of them are not convenient in use.

SUMMARY OF THE INVENTION

It is an object of the invention to provide a MEMS differential actuated nano probe including a MEMS differential actuator.

The MEMS differential actuator includes four suspension beams and a connecting base. The four suspension beams are arranged in parallel and respectively connected to corners at one side of the connecting base. The probe is mounted on the connecting base away from the suspension beams. Deflection of the MEMS differential actuator allows the movement of the probe in different directions.

The MEMS differential actuated nano prober can be driven thermally, piezoelectrically or electrostatically. When the MEMS differential actuated nano probe is driven thermally, two suspension beams elongate due to thermal expansion so that the actuator deflects toward the non-heated portions of the suspension beams and thus the probe is driven to move. By means of heating the suspension beams at different positions, the MEMS differential actuated nano probe deflects in two directions with two degrees of freedom, i.e., vertical and horizontal motion.

In the case that the electrostatic force is used to drive the nano probe to deflect, an electrode plate is mounted respectively at upper, lower, right and left sides of the connecting base. When the connecting base is applied with a positive voltage, the electrode plates are grounded to allow the MEMS differential actuated nano probe to deflect in vertical and horizontal directions.

In the case that the MEMS differential actuated nano probe is driven piezoelectrically, the four suspension beams are made of piezoelectric materials such as quartz, ZnO or $Pb(Zr,Ti)O_3$ (PZT). By means of applying voltage, two of the suspension beams elongate or shortened, and the MEMS differential actuated nano probe deflects in directions.

As described above, the MEMS differential actuator can reflect in vertical and horizontal directions, which is contrast to the prior art that only moves in one direction. Therefore, the application thereof is broadened.

The MEMS differential actuated nano probe applicable in a scanning probe microscope, such as a scanning tunneling microscope (STM), an atomic force microscope (AFM), electric force microscope (EFM), a Kelvin force microscope (KFM), scanning Maxwell force microscope (SMM), frictional force microscope (FFM), lateral force microscope (LFM), magnetic force microscope (MFM), magnetic resonance force microscope (MRFM), scanning capacitance microscope (SCM), scanning thermal microscope (SThM) and scanning near-field optical microscope (SNOM). When the scanning probe microscope (SPM) is applied in data storage, the MEMS differential actuated nano probe can deflect vertically with increased force constant tolerance. The probe also deflects in horizontally to increase the capability of local scanning.

In the applications of data storage and nanolithography, the MEMS actuator heats the tip of the nano probe while in operation for data writing and reading and performing nanolithography. Furthermore, the MEMS differential actuated nano probe can be also applied in dip pen nanolithography as a molecule self-assembling mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and is thus not limitative of the present invention, wherein:

FIG. 4A to FIG. 4K are flowcharts of production of the MEMS differential actuated nano probe according to one embodiment of the invention;

FIG. 5 is a schematic view of a MEMS differential actuated nano probe used in a scanning tunneling microscope (STM) according to one embodiment of the invention;

DETAILED DESCRIPTION OF THE INVENTION

Figure 1:
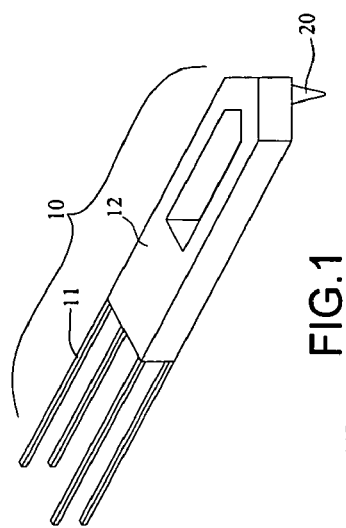
FIG. 1 is a perspective view of a MEMS differential actuated nano probe according to one embodiment of the invention.

FIG. 1 is a perspective view of a MEMS differential actuated nano probe according to one embodiment of the invention. The MEMS differential actuated nano probe is an active probe including a nano probe 20 and a MEMS differential actuator capable of moving in two directions with two degrees of freedom. The MEMS differential actuated nano probe is fabricated by a MEMS process.

The MEMS differential actuator 10 includes four suspension beams 11 and a connecting base 12. The four suspension beams 11 are arranged in parallel and respectively connected to corners at one side of the connecting base 12.

The nano probe 20 is mounted on the connecting base 12 away from the suspension beams 11. The nano probe 20 is driven by the MEMS differential actuator 10 to move in different directions.

The MEMS differential actuated nano probe is actuated thermally, electrostatically or piezoelectrically.

FIG. 2A through FIG. 2D illustrate vertical and horizontal movements of a nano probe that is driven electrostatically. Electrode plates are mounted on upper, lower, right and left sides of the connecting base 12.

Figure 2A:
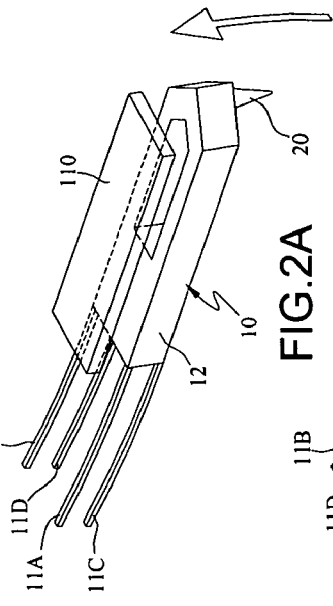
FIG. 2A to FIG. 2D are schematic views of a vertical and horizontal movement of a nano probe that is driven electrostatically according to one embodiment of the invention.
Figure 2B:
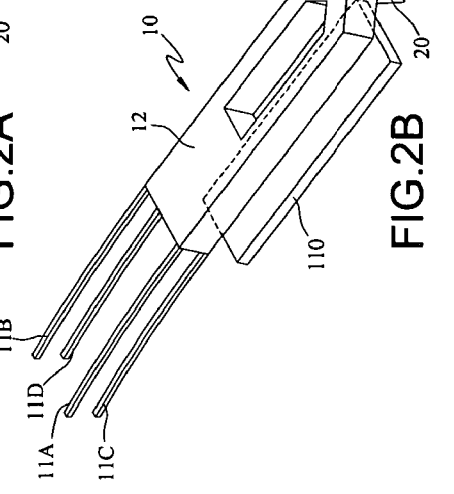
Figure 2C:
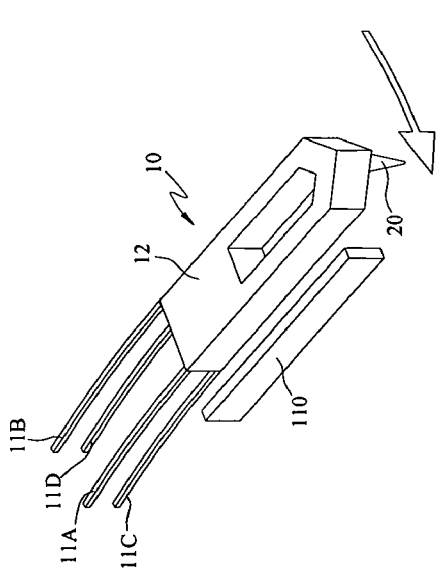
Figure 2D:
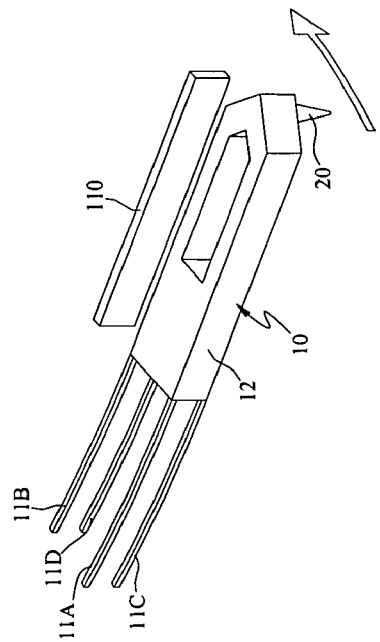

Referring to FIG. 2A, the connecting base 12 is applied with a positive voltage and an upper electrode plate is grounded to deflect the actuator 10 upward. Referring to FIG. 2B to FIG. 2D, the lower, left and right electrode plates 110 are grounded to respectively deflect the actuator 10 downward, left and right.

Similarly, if the actuator 10 is driven piezoelectrically, then the suspension beams 11 are made of piezoelectric materials. By applying voltage, two of them elongate to achieve vertical or horizontal deflection of the actuator 10. The piezoelectric material can be, for example, quartz, ZnO or Pb(Zr,Ti)O$_3$ (PZT).

When the actuator 10 is actuated thermally, two of the suspension beams 11 thermally expand, and the whole structure of the actuator 10 inclines toward the remaining non-heated suspension beams 11, thereby deflecting the probe 20. In practice, the suspension beams are controlled via a control circuit to change the direction of probe deflection.

FIG. 3A to FIG. 3D are schematic views illustrating vertical and horizontal movements of a MEMS differential actuated nano probe by means of thermally expanding of the suspension beams 11A, 11B, 11C and 11D at different positions.

Figure 3A:
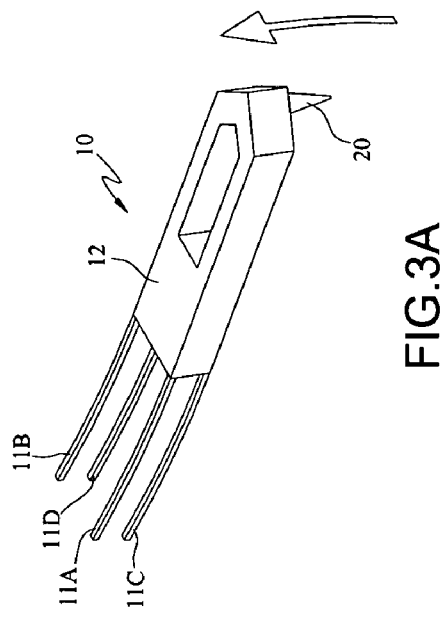
FIG. 3A to FIG. 3D are schematic views illustrating the vertical and horizontal movements of a MEMS differential actuated nano probe by means of thermally expanding of the different suspension beams, according to one embodiment of the invention.

FIG. 3A illustrates the upward deflection of the probe when the suspension beams 11C and 11D are heated. When the control circuit acts to heat the suspension beams 11C and 11D, the suspension beams 11C and 11D elongate to allow the actuator 10 to deflect upward, thereby driving the probe 20 upward.

Figure 3B:
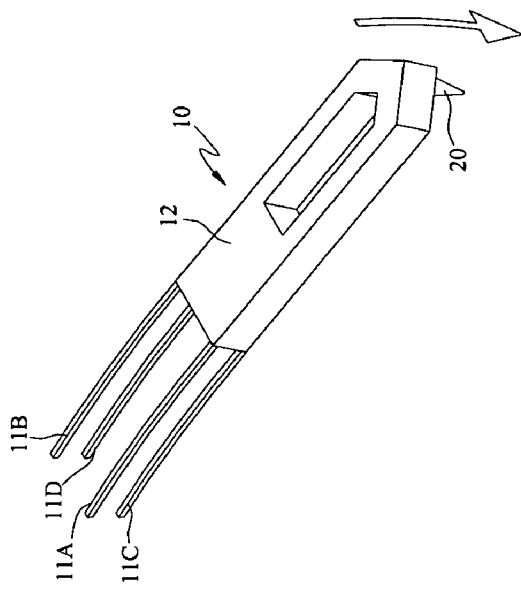

When the probe is to move downward, as shown in FIG. 3B, the suspension beams 11A and 11B are heated under control of the control circuit and elongate due to thermal expansion so that the actuator 10 deflects downward and the probe 20 thereby deflects downward.

Figure 3C:
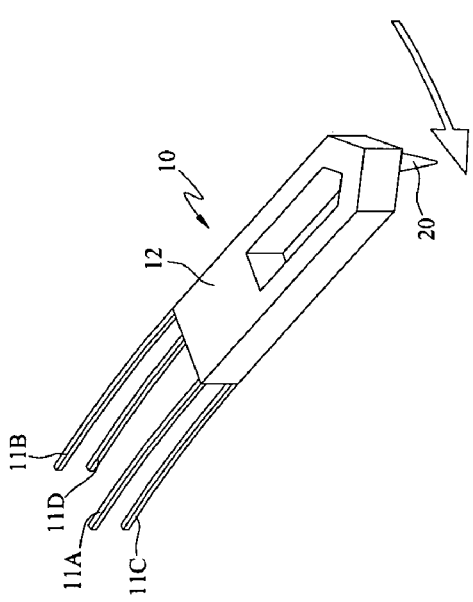

FIG. 3C shows the probe 20 deflected out to the paper. When the suspension beams 11B and 11D are heated under control of the control circuit, they elongate due to thermal expansion so that the actuator 10 deflects and thus the probe 20 thereby deflects out to the paper.

Figure 3D:
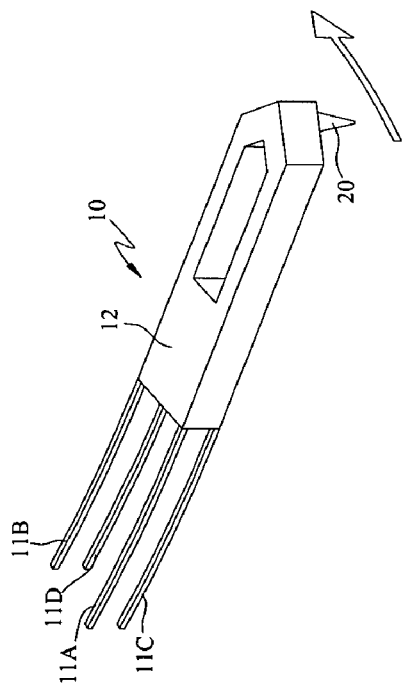

Referring to FIG. 3D, the probe is to move in a direction normal to the surface of the paper, the suspension beams 11A and 11C are heated under control of the control circuit and elongate due to thermal expansion, so that the actuator 10 and thus the probe 20 deflect in the direction, normal to the surface of the paper sheet.

The MEMS differential actuated nano probe is an active probe. Thereby, the structure and operation of the nano probe can be simplified.

FIG. 4A to FIG. 4K illustrate flowcharts of the fabrication of a MEMS differential actuated nano probe according to an embodiment of the invention.

Figure 4A:
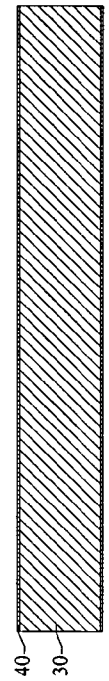

Referring to FIG. 4A, a silicon chip 30 with a crystal surface (100) is provided. A first insulation layer 40 is deposited on the silicon chip 30. The first insulation layer 40 can be, for example, SiO$_2$.

Figure 4B:
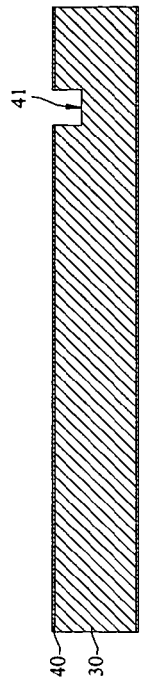

Referring to FIG. 4B, a probe pattern is defined on the insulation layer 40 by lithography. Then, a dry etching is performed using a deep reactive ion etching (DRIE) machine to form a trench 41 at the location of the probe pattern as an upper portion of a probe.

Figure 4C:
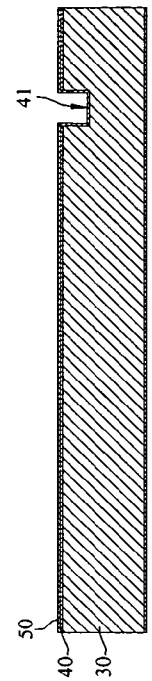

Referring to FIG. 4C, a second insulation layer 50 is formed over the first insulation layer 40 and the trench 41 to protect sidewalls of the trench 41 during wet etching of the silicon chip 30 in subsequent processes. The material of the second insulation layer 50 is, for example, SiO$_2$.

Figure 4D:
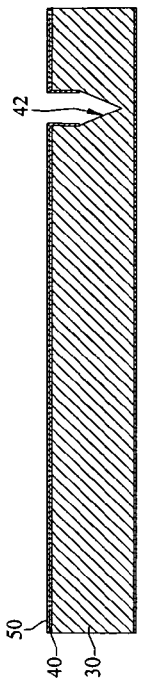

Referring to FIG. 4D, the whole silicon chip 30 is immersed in TMAH or KOH solution for wet etching to form a cone-shaped recess 42. The trench 41 and the recess 42 are parts forming the nano probe structures.

Figure 4E:
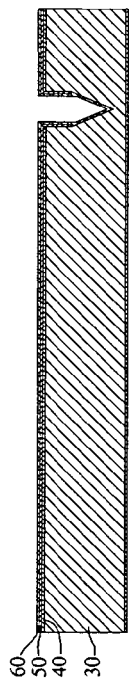

Referring to FIG. 4E, a third insulation layer 60 is formed over the trench 41 and the recess 42. The material of the third insulation layer 60 is, for example, $SiO_2$.

Figure 4F:
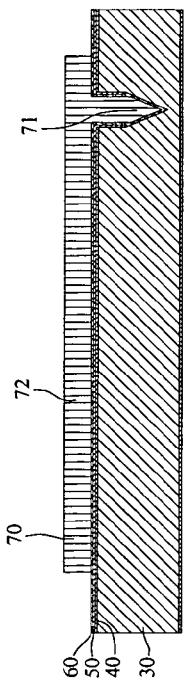

Referring to FIG. 4F, a polysilicon layer is deposited on the third insulation layer 60 by low-pressure chemical vapor deposition as a first structural layer 70. The part where the third insulation layer 60 fills up the trench 41 and the recess 42, forms a tip 71 of the probe.

Patterns of two suspension beams 72 and a connecting base 73 are defined on the first structural layer 70 by lithography. The patterns are chemically etched to form two suspension beams 72 connected via the connecting base 73. The position of the connecting base 73 corresponds to the position of the probe 71.

Figure 4G:
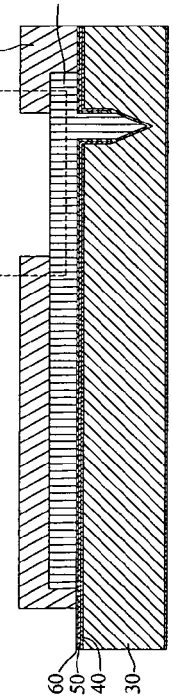

Referring to FIG. 4G, a PSG layer is deposited on the first structural layer 70 by low-pressure chemical vapor deposition as a first sacrificial layer 80. The first sacrificial layer 80 is defined by lithography and etched to form a contact hole connecting the first structural layer 70 and a second structural layer 90 formed later.

Figure 4H:
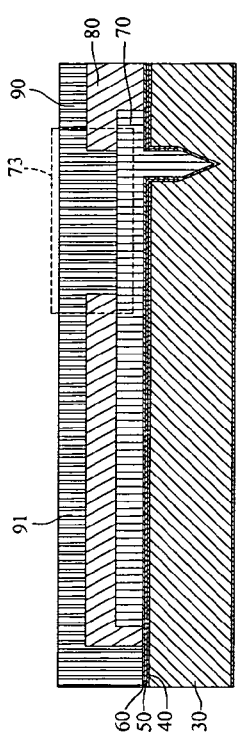

Referring to FIG. 4H, another polysilicon layer is deposited on the first sacrificial layer 80 as the second structural layer 90. Patterns of two suspension beams 91 and another connecting base 73 are defined on the second structural layer 90 by lithography. The patterns are chemically etched to form two suspension beams 91 and a connecting base 73. The suspension beams 91 correspond to the suspension beams 72 on the first structural layer 70 so that the suspension beams 72 are arranged parallel to the suspension beams 91.

Referring to FIG. 4I, a second sacrificial layer 100 is deposited on the second structural layer 90 by low-pressure chemical vapor deposition. The second sacrificial layer 100 performed as a protective layer in subsequent processes.

Referring to FIG. 4J, the silicon chip 30 is immersed in a TMAH or KOH solution to etch a rear portion of the silicon chip 30 and expose the horn-shaped probe 71, and a standoff 31 on the silicon chip 30.

Referring to FIG. 4K, the silicon chip 30 is immersed in an HF solution to remove the first and second sacrificial layers 80, 100 so that the suspension beams 72, 91, the connecting base 73 and the probe 71 are suspended above the standoff 31. Thereby, the MEMS differential actuated nano probe is accomplished.

The MEMS differential actuated nano probe according to the invention can be used as a scanning probe microscope such as a scanning tunneling microscope (STM), an atomic force microscope (AFM), electric force microscope (EFM), a Kelvin force microscope (KFM), scanning Maxwell force microscope (SMM), frictional force microscope (FFM), lateral force microscope (LFM), magnetic force microscope (MFM), magnetic resonance force microscope (MRFM), scanning capacitance microscope (SCM), scanning thermal microscope (SThM) and scanning near-field optical microscope (SNOM). When the SPM is applied in data storage, the MEMS differential actuator can vertically move with broadened force constant design, and horizontally move with increased local scanning performance.

In the applications of data storage and nano lithography, the MEMS differential actuator heats the tip of the probe in operation, for nano lithography and data writing and reading. The MEMS differential actuator can be applied in dip pen nanolithography for molecule self-assembly.

FIG. 5 is a schematic view of MEMS differential actuated nano probe 10 used in a scanning tunneling microscope (STM). The MEMS differential actuator 10 has a nano probe 20 of scanning tunneling microscope at its front end.

The scanning tunneling microscope includes a power supply for supplying a tunneling voltage between the probe 20 and a sample. According to the quantum theory, when a gap between the sample and the probe reaches a critical distance, the electrons pass through the energy barrier and then generate a tunneling current.

The tunneling current I and the gap Z between the sample and the probe match the relationship below:

$$I \propto \mathrm{Exp}\left(-A\sqrt{\left(\phi - \frac{V}{2}\right) \cdot Z}\right)$$

$$A = \frac{h}{\pi}\sqrt{2m}$$

wherein h is a Planck Constant, m is the mass of an electron, $\psi$ is a potential energy of tunneling gap, and V is an applied potential energy. The scanning tunneling microscope includes a current amplifier used to amplify the tunneling current. Since the tunneling current and the gas between the probe and the sample have an exponential relationship, the amplified tunneling current must pass through a LOG amplifier to compare with a predetermined current in a current comparator.

Finally, the driving electronics drives the MEMS differential actuator 10 according to the result of comparison to achieve the scanning tunneling microscope. In general, the scanning tunneling microscope retrieves images in two modes: constant-current mode or constant-height mode.

The constant-current mode is performed by a feedback scanning mechanism, and is suitable for samples having a highly rippling topography as shown in FIG. 5. The scanning speed of the constant-current mode is slow. Different from the constant-current mode, the constant-height mode performs scanning at a predetermined height and records tunneling currents at various positions. This method is suitable for samples having a lowly rippling topography with fast scanning speed. The MEMS differential actuated nano probe can be operated under these two modes.

Figure 6:
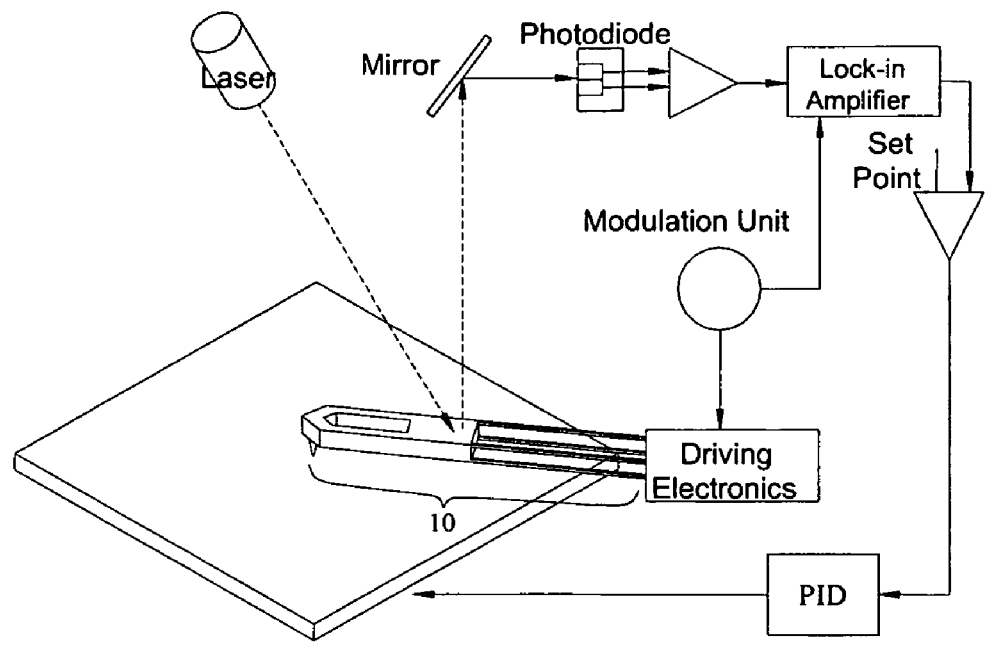
FIG. 6 is a schematic view illustrating the MEMS differential actuated nano probe operating under AFM, FFM and MFM.

FIG. 6 is a schematic view illustrating the MEMS differential actuated nano probe operating under AFM, FFM and MFM. When a force is generated between the samples and the probe 20, the four suspension beams 11 constituting the MEMS differential actuated nano probe are slightly deformed by the generated force. The slight deformation will be detected by the light, emitted from a low-power laser and reflected to a photodiode via a mirror. A signal generated from the photodiode is amplified via a lock-in amplifier to control the movement of the MEMS differential actuator and the samples by means of a feedback circuit. The theory of the AFM is based on the Van Der Waals force.

AFM includes a contact model and a non-contact model. The contact model is similar to the scanning tunneling microscope and comprising constant-force or constant-height mode.

A constant-force mode controls the distance between the MEMS differential actuated nano probe and the samples by the feedback mechanism. The feedback mechanism of the constant-height mode is a close-loop control system. By detecting signal generated by light emitted on the nano probe from the low-power laser and reflected to the photodiode via the mirror to measure the surface profile with atomic-scale. In the non-contact AFM model, the MEMS differential actuator vibrates with small amplitude to approach the surface of the samples. The atomic-scale topography is measured with the change in amplitude, frequency and phase.

A modulation unit sends a signal to the MEMS differential actuator via driving electronics to generate small amplitude. The change in frequency or phase can be sensed via the detection signal. The detection signal is amplified via the amplifier and locked at a predetermined frequency in a lock-in amplifier. After noise is filtered off, the detection signal is compared with initial data in the modulation unit for the control of the distance between the MEMS differential actuated nano probe and the samples. Thereby, AFM image retrieving is accomplished with the feedback mechanism.

FFM is also called as a lateral force microscope (LFM), which is based on frictional force generated when the probe comes in contact with the samples. The MEMS differential actuated nano probe operates in a similar way as the contact model of AFM. The MFM is based on a magnetic film coated on the probe for measuring the distribution of magnetic force over the surfaces of the samples. The MFM operation is similar to that of AFM.

Figure 7:
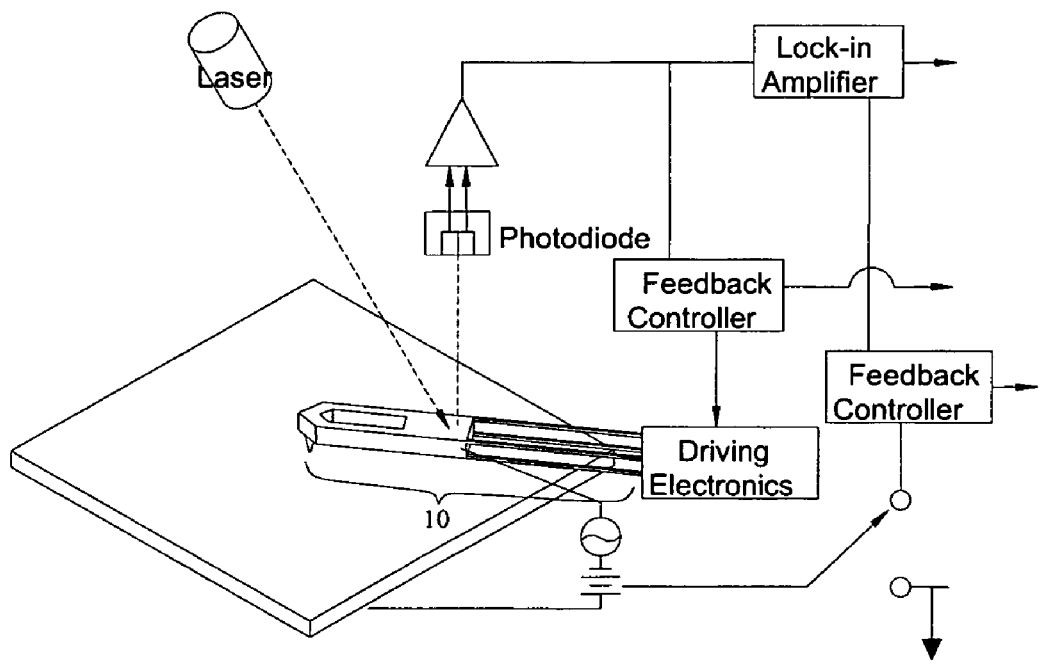
FIG. 7 is a schematic view of the MEMS differential actuator applied in an electriostatical force microscope (EFM)

FIG. 7 is a schematic view of the MEMS differential actuator applied in an electrostatic force microscope (EFM). The EFM is mainly used in measuring the distribution of electrostatic charges and electric field over the surfaces of the samples. It is based on an AC signal ($V=V_{DC}+V_{AC}\sin(\omega t)$) applied between the MEMS differential actuated nano probe and the samples.

By detecting the detection signal generated by light emission on the nano probe 20 from the low-power laser and reflected to the photodiode, the deformation of the MEMS differential actuator is sensed. The control circuit keeps the constant distance between the MEMS differential actuator nano probe and the samples. The amplitude of the MEMS differential actuator at vibration frequency $\bar{\alpha}$ is obtained by using the lock-in amplifier. The distributions of the electrostatic charges and the electric field are therefore obtained.

Figure 8:
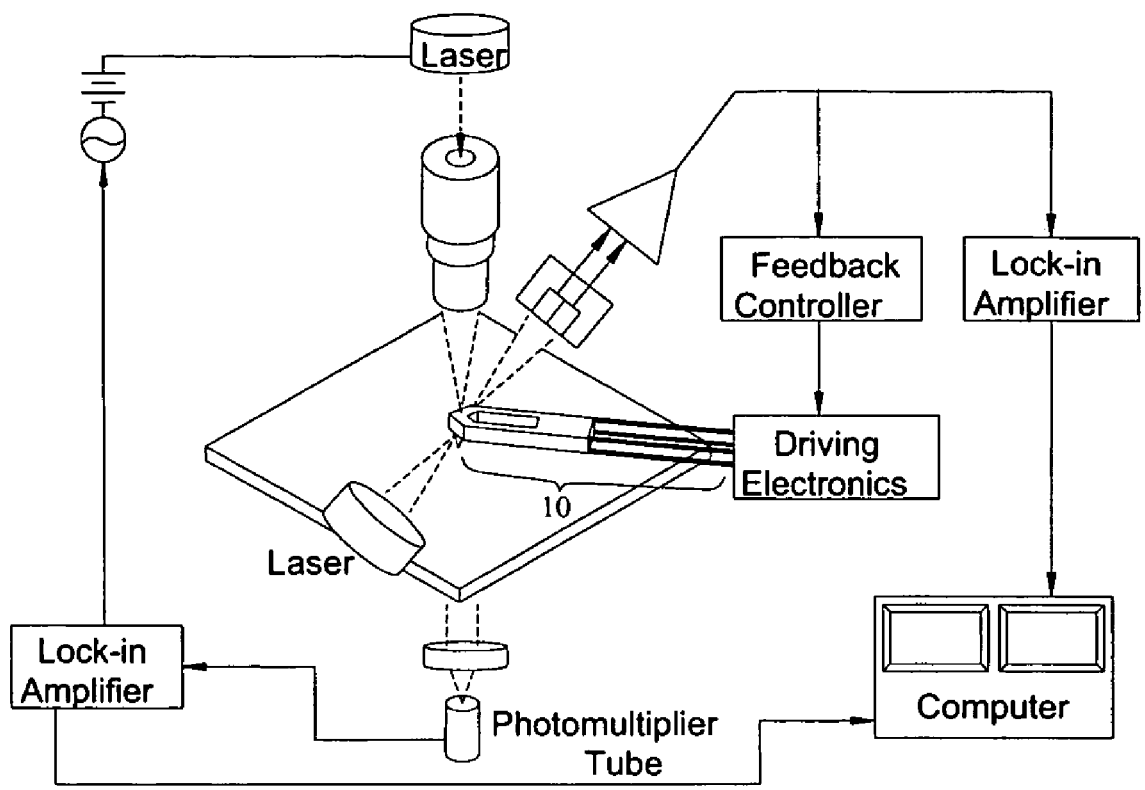
FIG. 8 is a schematic view of a MEMS differential actuator applied in SNOM. The SNOM is based on the AFM system that controls the distance between the probe and the samples by the feedback system.

FIG. 8 is a schematic view of a MEMS differential actuator applied in SNOM. The SNOM is based on an AFM system that controls the distance between the probe and the samples by the feedback control system. The SNOM performs scanning with a non-contact model to measure the topography and to achieve near-field imaging of the samples.

Referring to FIG. 8, the control circuit controls the vibration of the MEMS differential actuated nano probe at a resonance frequency. The feedback control is performed in a way similar to the AFM. That is, the low-power laser emits the light on the nano probe. The light is then reflected onto the photodiode to generate a detection signal. With the use of the detection signal and the lock-in amplifier, the amplitude of the vibration of the MEMS differential actuated nano probe is obtained. Thereby, the topographies of the samples are measured. In addition, a laser is focused on a pinhole of the MEMS differential actuated nano probe to achieve the near-field optical microscope. The light passes through the samples and a photomultiplier tube, and is amplified via the lock-in amplifier. The images of a near-field microscope are obtained.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A MEMS differential actuated nano probe, comprising:
a MEMS actuator, comprising:
a connecting base; and
two suspension beams arranged in parallel and connected to a first side of the connecting base, the suspension beams are formed of a piezoelectric material; and
a probe, mounted on a second side of the connecting base adjacent to the first side;
by applying a voltage to one of the suspension beams, the suspension beam extended or shortened in order to deflect the MEMS differential actuated nano probe toward the other suspension beam, so that the MEMS differential actuated nano probe has one degree of freedom.

2. The probe of claim 1, wherein the piezoelectric material is selected from a group consisting of quartz, ZnO and $(Pb(Zr,Ti)O_3$ (PZT).

3. The probe of claim 1, further comprising two other suspension beams, the suspension beams and the other suspension beams arranged in a rectangular shape and connected to the first side of the connecting base, wherein the probe having two degrees of freedom by applying a voltage to the suspension beams and the other suspension beams at different positions.

* * * * *